Figure 1:
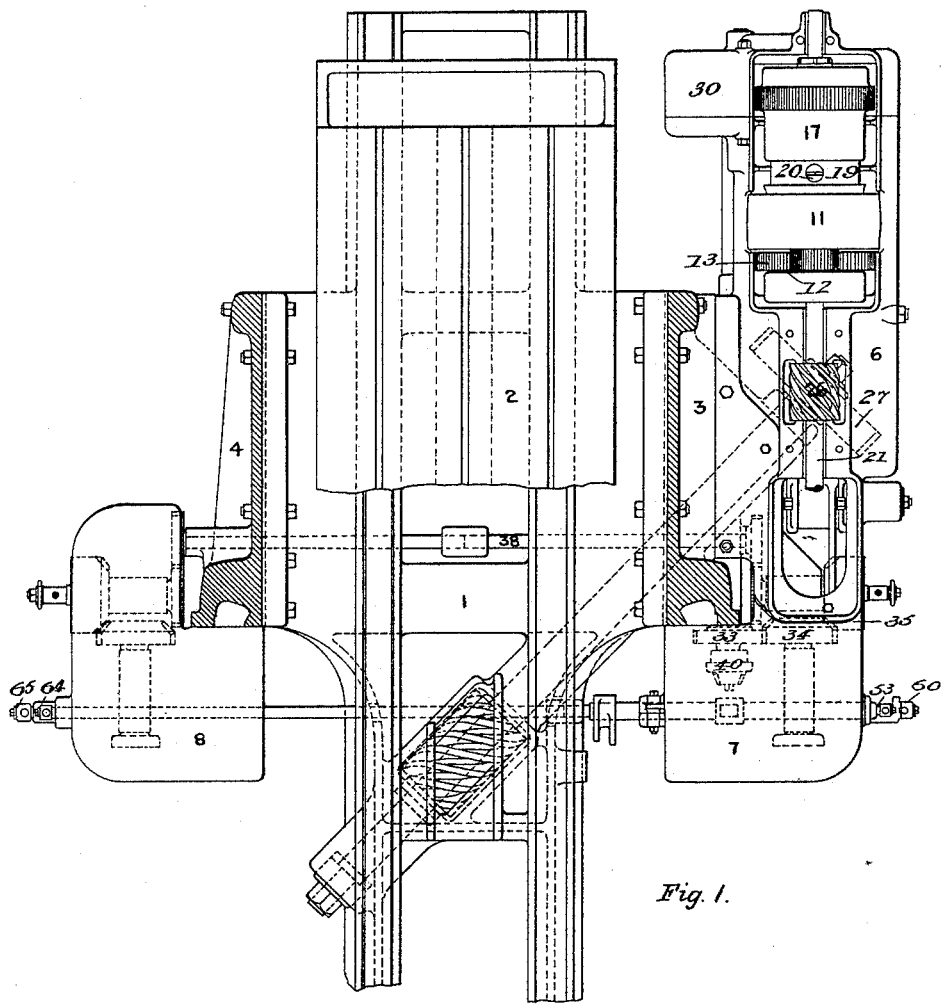

(No Model.) 11 Sheets—Sheet 1.
W. LEWIS.
PLANING MACHINE FOR METAL.

No. 497,754. Patented May 16, 1893.

WITNESSES:
Harry G. Stewart
John T. Ramsden.

INVENTOR
Wilfred Lewis (No Model.)  11 Sheets—Sheet 3.
W. LEWIS.
PLANING MACHINE FOR METAL.

No. 497,754. Patented May 16, 1893.

WITNESSES:
Harry G. Stewart
John T. Ramsden

INVENTOR
Wilfred Lewis (No Model.) 11 Sheets—Sheet 4.
W. LEWIS.
PLANING MACHINE FOR METAL.
No. 497,754. Patented May 16, 1893.
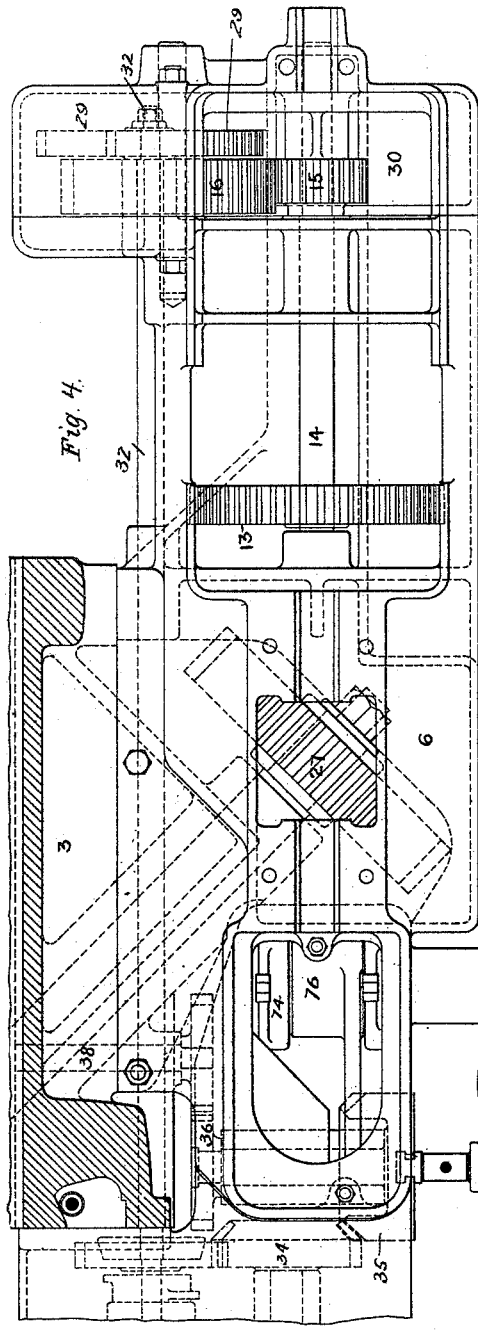
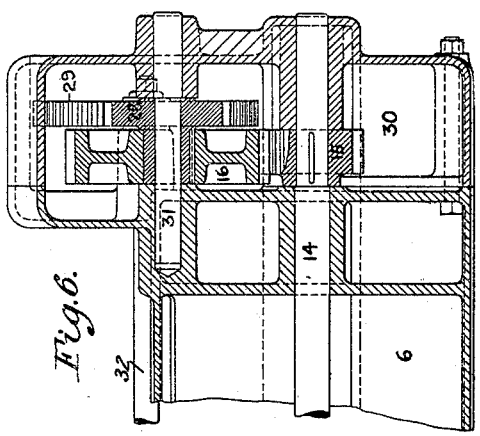
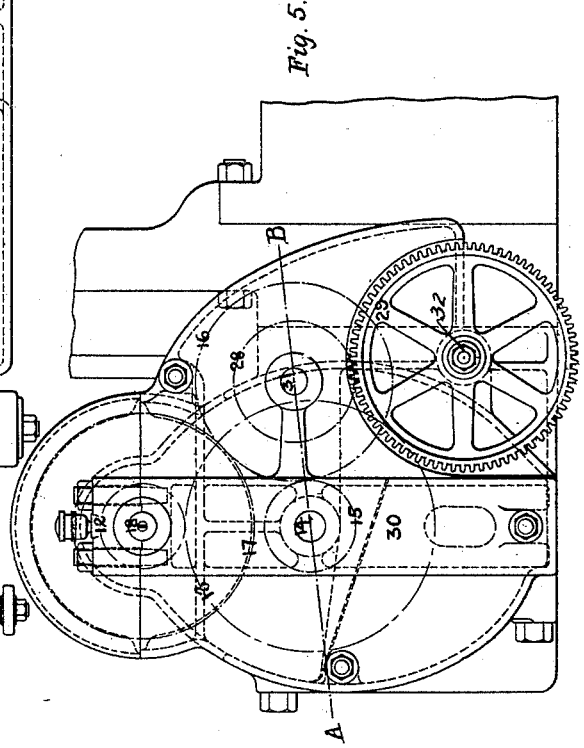
WITNESSES:
Harry G. Stewart
John T. Ramsden.
INVENTOR
Wilfred Lewis

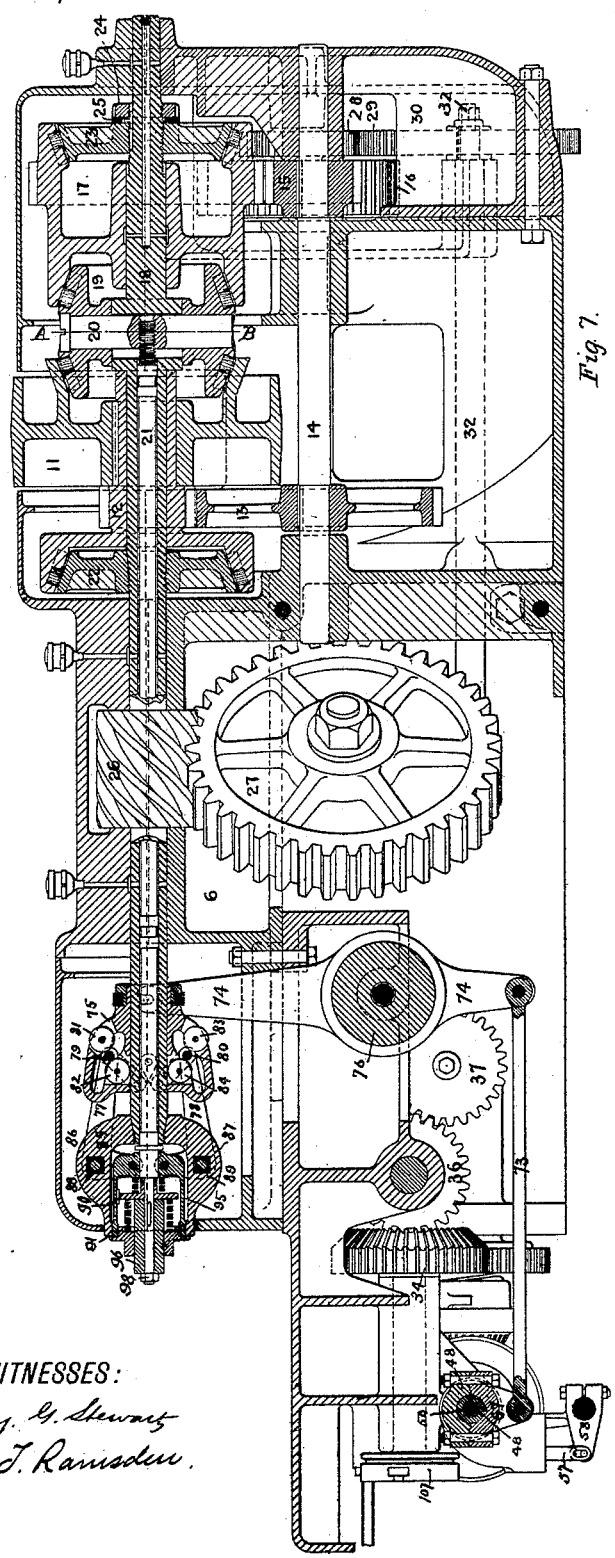

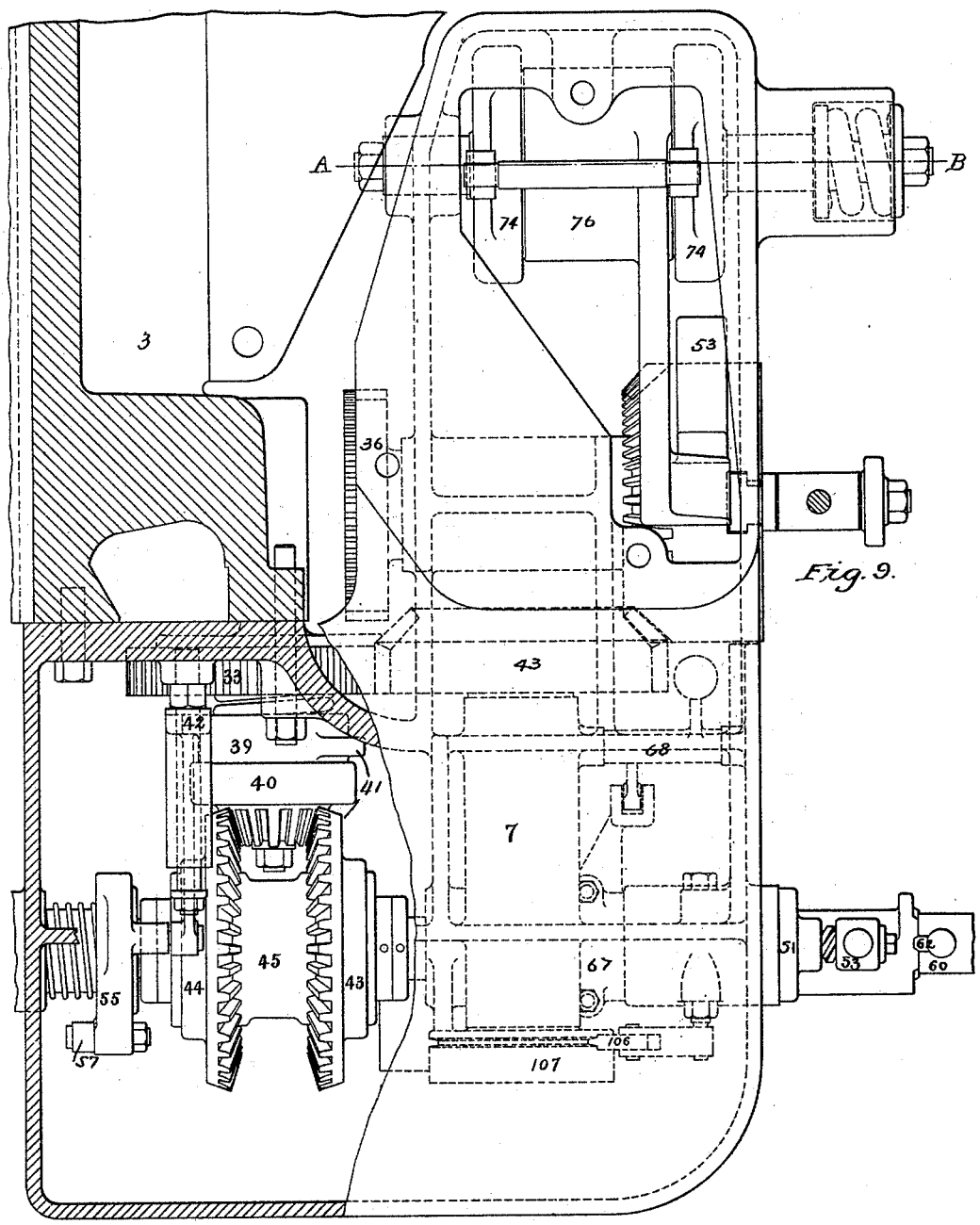

(No Model.) 11 Sheets—Sheet 7.

W. LEWIS.
PLANING MACHINE FOR METAL.

No. 497,754. Patented May 16, 1893.

WITNESSES:
Harry G. Stewart
John T. Ramsden.

INVENTOR
Wilfred Lewis

THE NORRIS PETERS CO., PHOTO-LITHO., WASHINGTON, D. C.

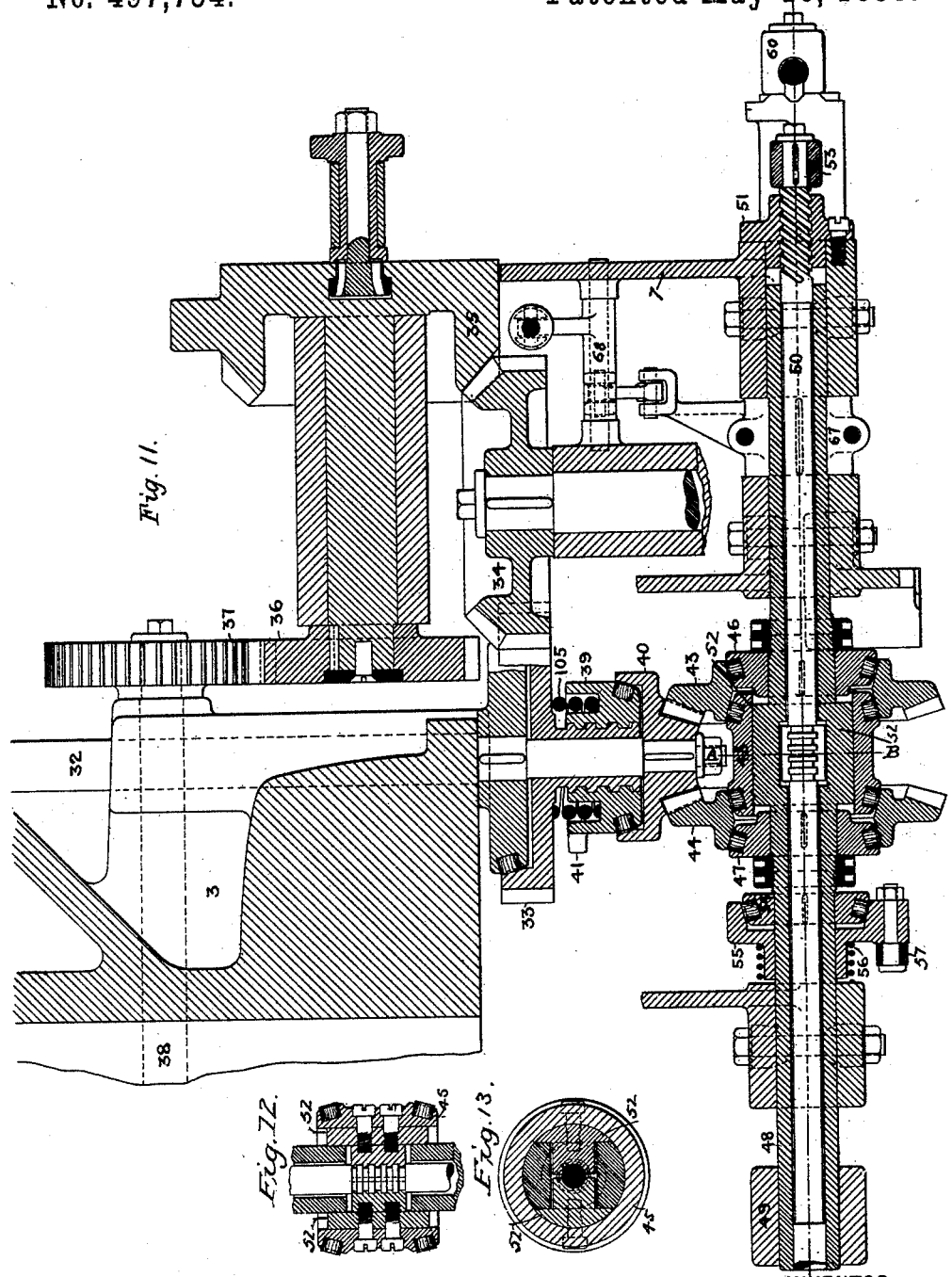

(No Model.)  
11 Sheets—Sheet 9.

W. LEWIS.
PLANING MACHINE FOR METAL.

No. 497,754. Patented May 16, 1893.

WITNESSES:
Harry G. Stewart
John T. Ramsden

INVENTOR
Wilfred Lewis (No Model.) 11 Sheets—Sheet 10.
W. LEWIS.
PLANING MACHINE FOR METAL.
No. 497,754. Patented May 16, 1893.
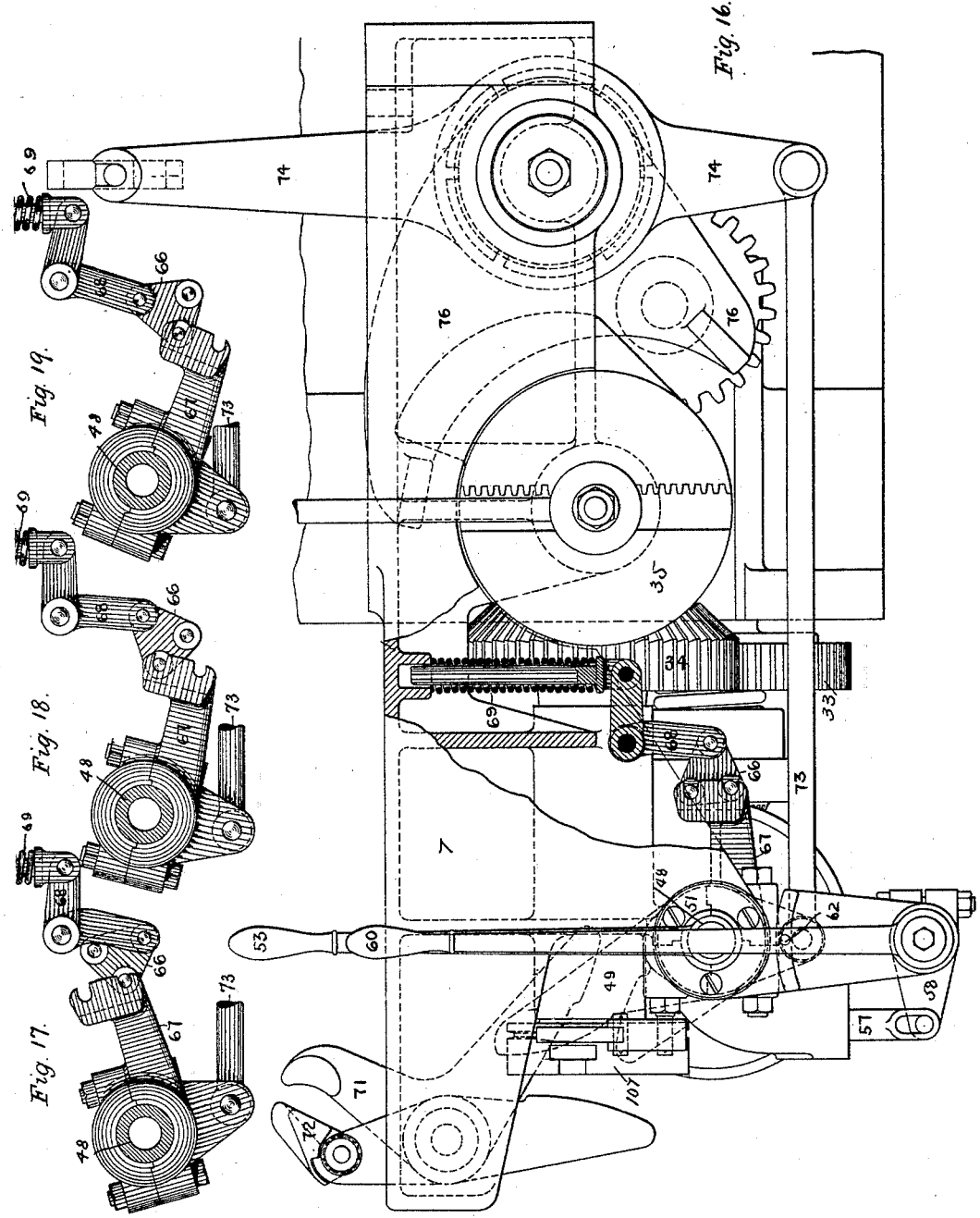

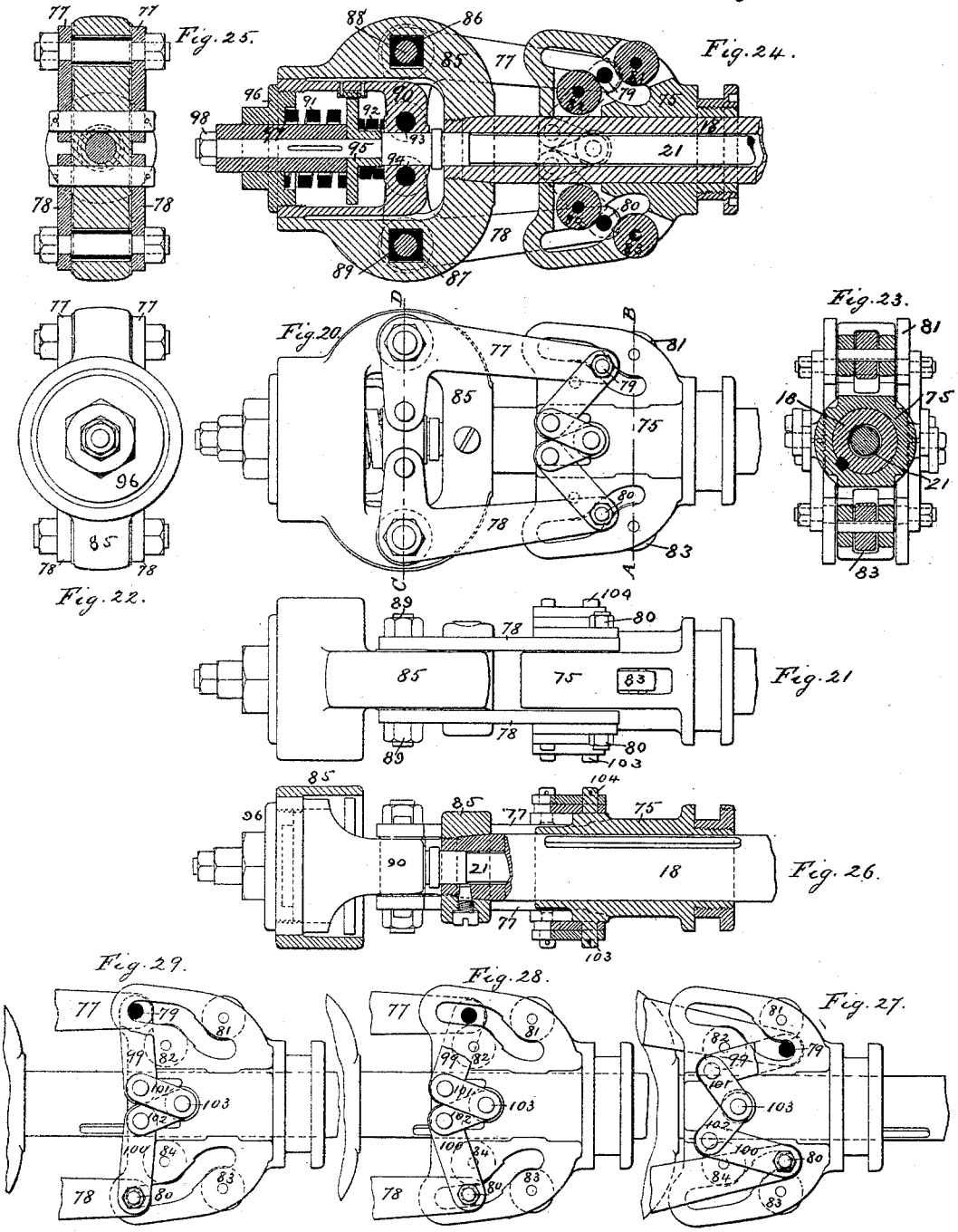

UNITED STATES PATENT OFFICE.

WILFRED LEWIS, OF PHILADELPHIA, PENNSYLVANIA, ASSIGNOR TO THE WILLIAM SELLERS & COMPANY, INCORPORATED, OF SAME PLACE.

PLANING-MACHINE FOR METALS.

SPECIFICATION forming part of Letters Patent No. 497,754, dated May 16, 1893.

Application filed February 6, 1892. Serial No. 420,585. (No model.)

*To all whom it may concern:*

Be it known that I, WILFRED LEWIS, of the city and county of Philadelphia and State of Pennsylvania, have invented certain new and useful Improvements in Planing-Machines for Metal, of which improvements the following is a specification.

My invention relates in general to that class of planing machines in which the metal to be planed is mounted upon a table which moves back and forth under a cutting tool, or the converse thereof in which the work is stationary and the tool moves, and particularly to the driving and feeding mechanisms in such planing machines. Improvements in these mechanisms have been developed to reduce the time lost in starting, stopping and returning, and other advantages in convenience and facility of manipulation have been at the same time secured as shown by Letters Patent No. 374,908, granted to William Sellers and John Sellers Bancroft, December 13, 1887, to which improvements my present invention particularly refers. The introduction of a friction clutch on the pulley shaft between two driving pulleys running constantly in opposite directions, overcame the necessity for reversing those pulleys with the table, and thus saved a great part of the loss in power occasioned by the reversal of the pulleys on the old belt shifting machines. The clutch being much smaller and lighter than the pulleys, opposed less inertia to stopping and starting and made it possible to increase the return speed of the planer much beyond anything theretofore attempted. This increased return speed was attended by a corresponding increase in the power required to drive the return movement, and by certain disadvantages such as increased wear and tear, heating of the clutch pulleys, and the effect thereof in disturbing the proper adjustment of the clutch, the difficulty of obtaining high ratios of forward and return speeds by a single countershaft, and also the difficulty of obtaining a friction clutch of small size of sufficient grip to drive the maximum cut desired. The severe pressure required to operate by hand the driving clutch of a large machine is objectionable and the heating and consequent expansion of the friction clutches are also objectionable, for this requires increased movement of the engaging member to obtain the same driving effect. To remedy these objectionable features, it is an object of my present invention to simplify the countershafting and increase the driving power of the machine under cut.

It is a further object of my invention to reduce the pressure required on the driving clutch and thereby increase the ease with which the machine can be operated by hand.

It is a further object of my invention to compensate for heating effects in the clutch so that the driving capacity may be constant.

It is a further object of my invention to provide an adjustment for wear in the driving clutch with an adjustment for position so that a uniform traverse can be easily maintained.

It is a further object of my invention to effect the movement of the driving clutch with as little effort on large machines as on small.

It is a further object of my invention to control the action of the feeding mechanism at pleasure and to indicate at the same time the direction in which the table was moving when the last feed took place.

It is a further object of my invention to guard against wear on the driving clutch when not in action.

It is a further object of my invention to secure the cams and levers which operate the driving clutches in stable equilibrium in three important and well defined positions required for their proper action.

It is a further object of my invention to reduce friction in the sliding fulcrum block and levers on the pulley shaft, and at the same time equalize the pressure on the clutch shifting levers.

It is a further object of my invention to drive the feeding train from the idle wheel in the train which gears the driving clutches together, and to these ends my invention consists in a shaft on which is mounted a belt pulley, which, at the same time, is the driving part of a friction clutch called the "pulley friction ring," which drives through reducing and reversing gears the driving part of another friction clutch called the "geared friction ring" both mounted on the same shaft.

Either of these clutch rings may be engaged with the shaft by means of a double faced counterpart of the friction rings, called the "reversing cone," which, in connection with the pulley friction ring and the geared friction ring form two friction clutches.

It further consists in abutment cones fixed on the pulley shaft, between which and the reversing cone, the friction rings may be clamped or released, the combination forming two "abutment friction clutches."

It further consists in the combination of metallic and non-metallic surfaces between the said friction rings and cones of the abutment friction clutches, so that the heating effect on one side of a ring may be neutralized by the expansion of the cone on its other side.

It further consists in an adjustable collar on the pulley shaft by which wear on the friction clutches can be taken up, in connection with an adjustable operating rod for correcting the disturbance caused by taking up the wear.

It further consists in reversing friction clutches on the rock shaft which controls the table movement called the "reversing rock shaft," by which the latter can be moved by power in either direction.

It further consists in a hand lever connected with the escapement stop and having sufficient lost motion to allow this stop to work automatically when the lever is in its middle position, or to hold the stop from moving when this lever is at either end of its stroke.

It further consists in a centering mechanism connected with the reversing rock shaft whereby the reversing cone is always brought to a central position when not in action.

It further consists in the combination of links and levers on the sliding fulcrum block of the pulley shaft, whereby the operating levers will remain in three positions of stable equilibrium.

It further consists in driving the feeding train, through the reversing wheel of the train, which gears the friction clutches together.

Figure 2:
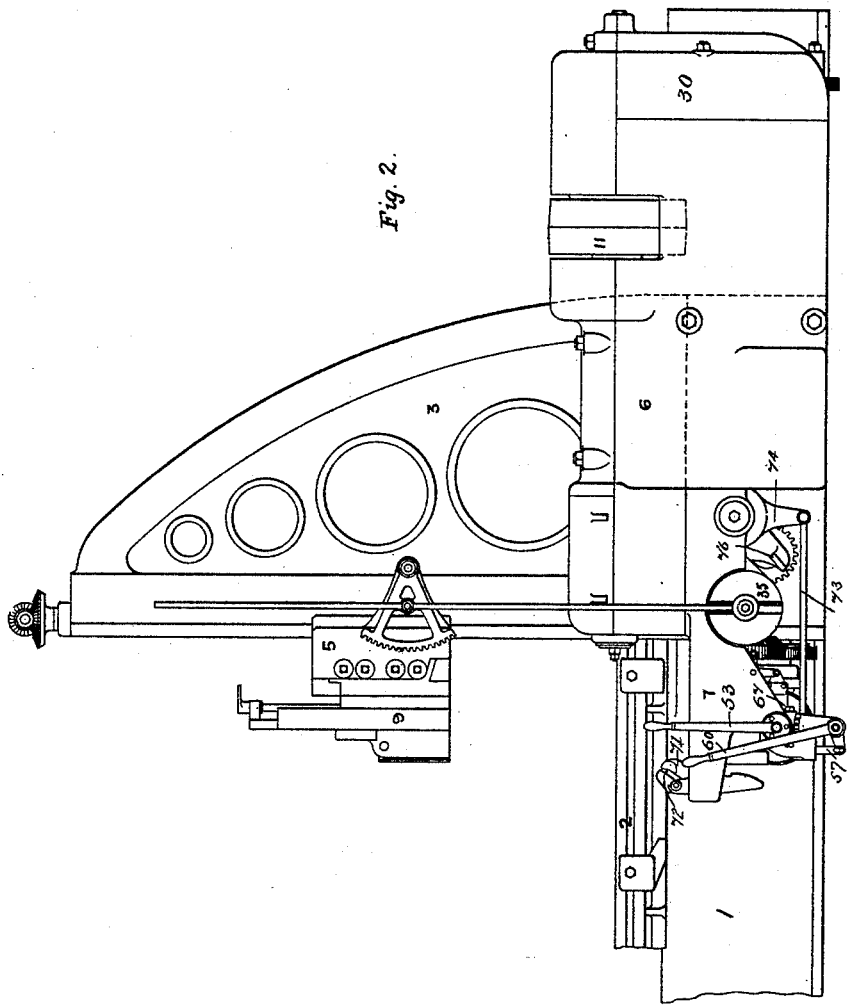
Figure 3:
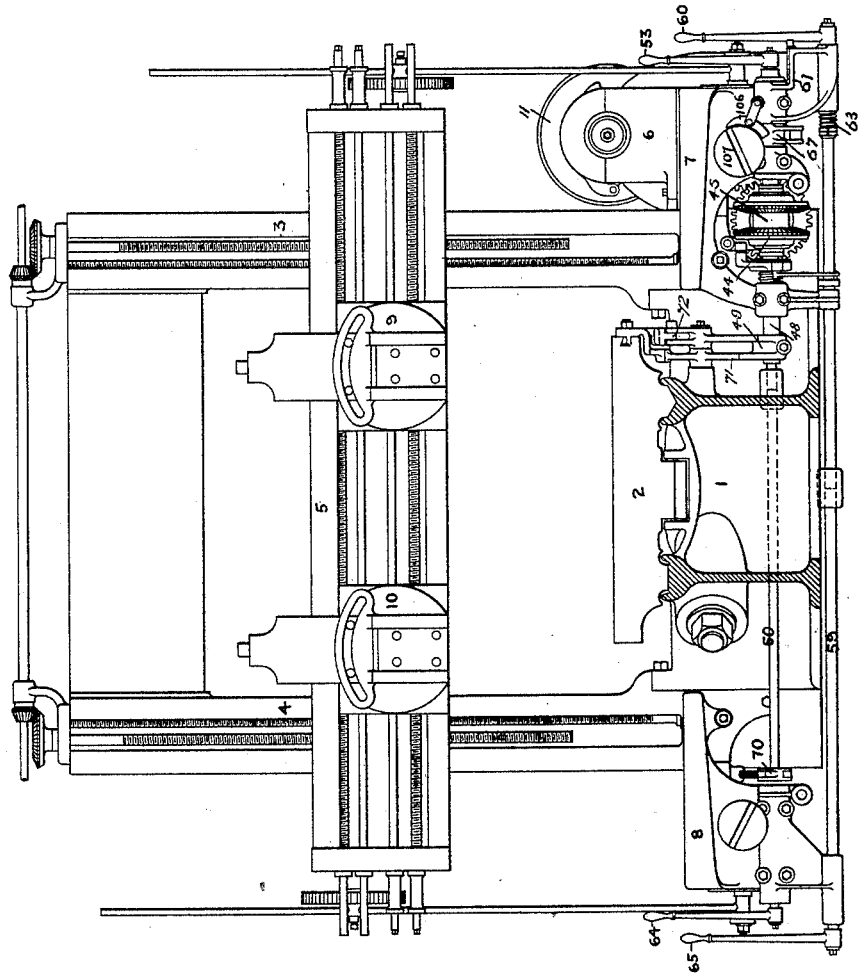
Figure 10:
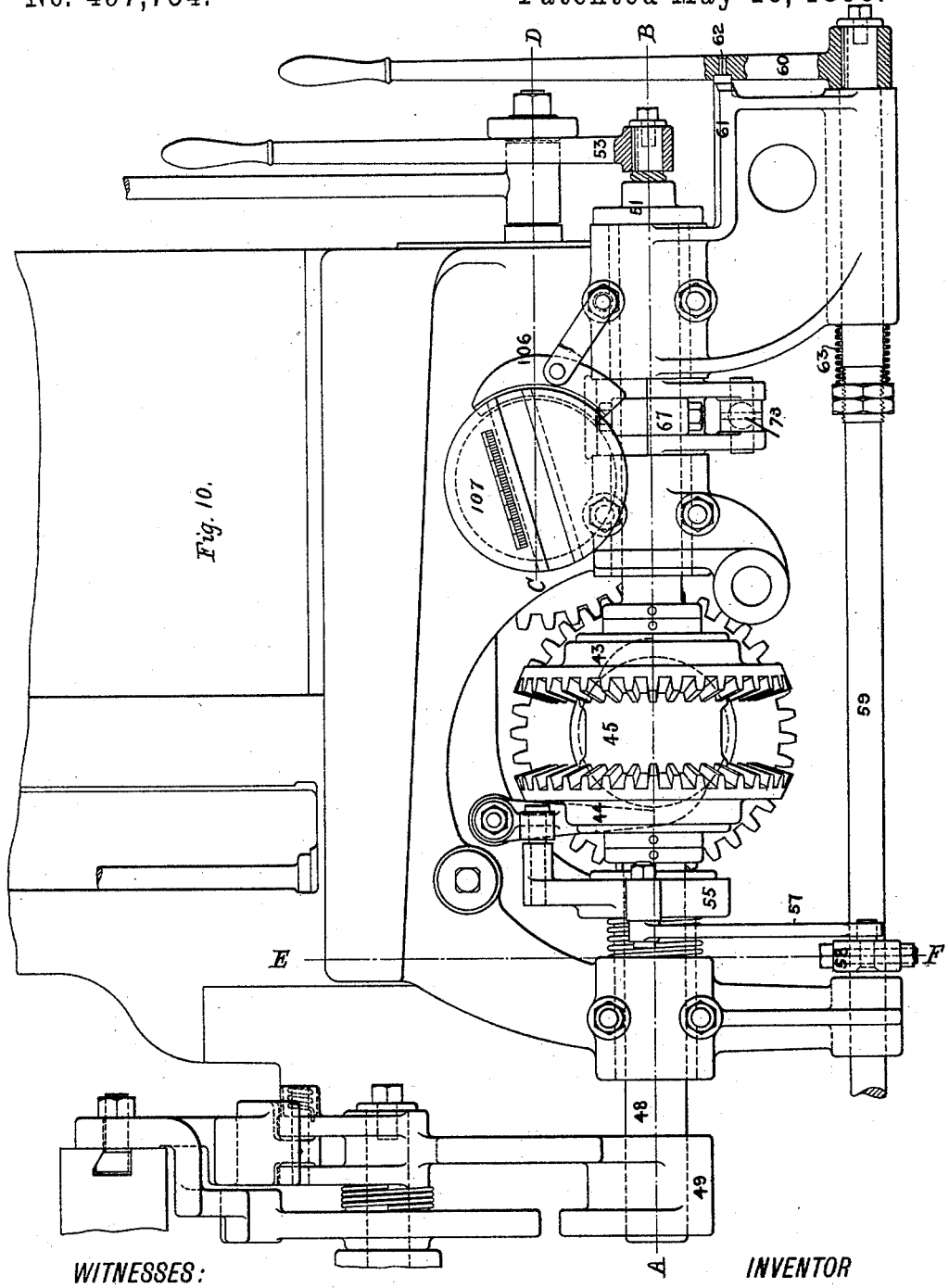
Figures 14, 15:
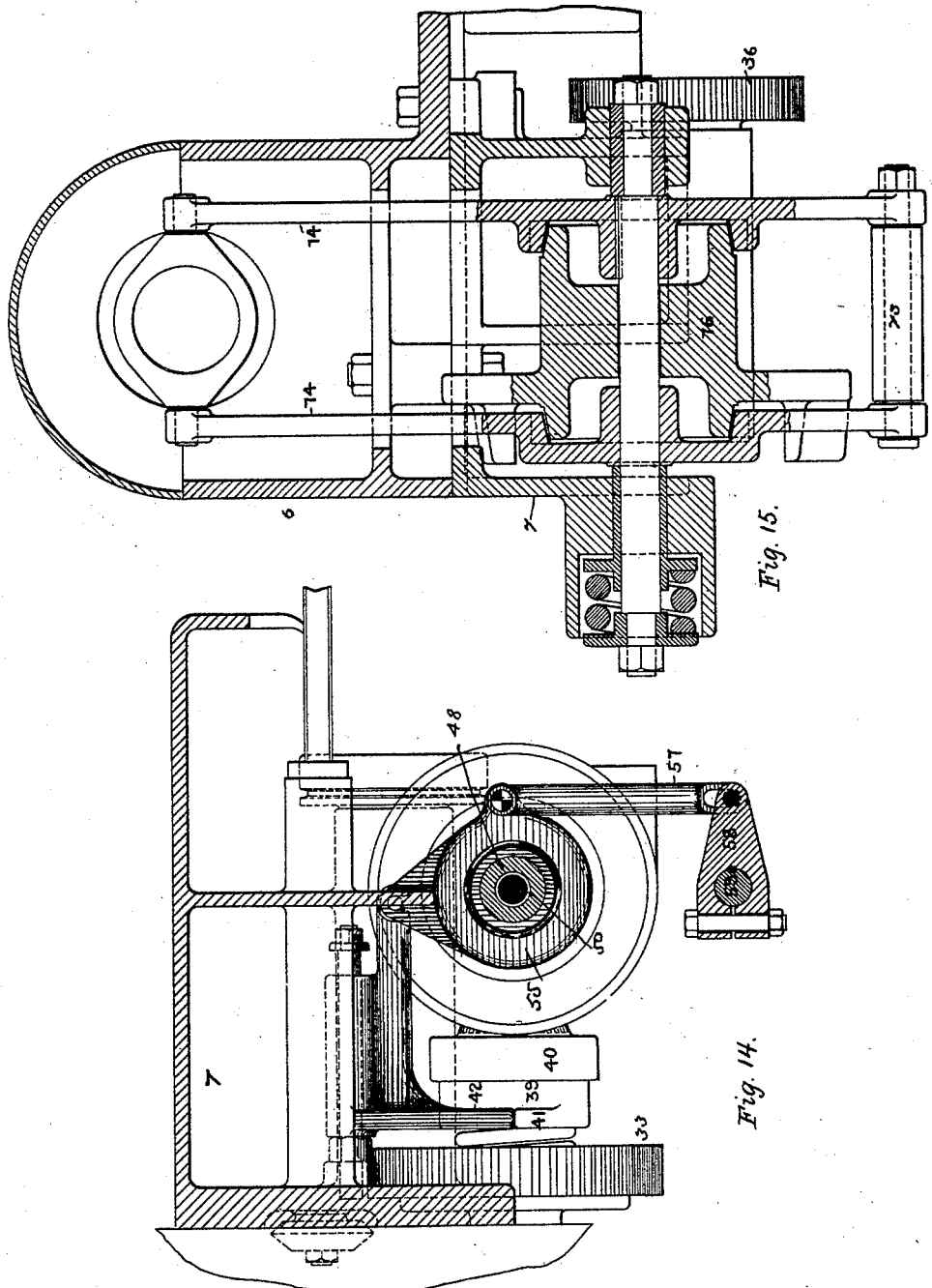

Figure 1, Sheet 1, is a plan, partly in section, of a planing machine embodying my present improvements. Fig. 2, Sheet 2, is a side elevation and Fig. 3, Sheet 3, an end elevation of Fig. 1. Fig. 4, Sheet 4, is an enlarged plan of the pulley frame with the pulley shaft and its cap removed, showing the gearing beneath and a section of the upright to which the frame is attached. Fig. 5 is an end elevation of Fig. 4, showing the location of the intermediate reversing gear and the feeding shaft. Fig. 6 is a section on the line A B Fig. 5. Fig. 7, Sheet 5, is a vertical section through the driving gear and clutches of the pulley frame shown in Fig. 4. Fig. 8 is a section through the reversing cone on the line A. B. Fig. 7. Fig. 9, Sheet 6 is a plan of the feed stand, part of which is broken away to show the gearing beneath. Fig. 10, Sheet 7, is an end elevation of the feed stand shown in Fig. 9. Fig. 11, Sheet 8, is a horizontal section on the planes A B and C D, Fig. 10, showing the power shifting clutches and a portion of the feed train adjacent to the upright. Fig. 12 is a section through the shifting shaft and clutch on a plane normal to that shown in Fig. 11. Fig. 13 is a section through the shifting shaft and clutch on the plane A B, Fig. 11. Fig. 14, Sheet 9, is an enlarged vertical section through the feed stand on the line E F, Fig. 10, showing the escapement stop and its connections. Fig. 15 is an enlarged vertical section on the line A B, Fig. 9 showing the safety clutch and levers in the reversing mechanism. Fig. 16, Sheet 10, is a side elevation of the feed stand shown in plan by Fig. 9, a portion of the stand being broken away to show more clearly the centering mechanism for the reversing rock shaft in a position corresponding to the table at rest. Fig. 17 shows the mechanism in a position corresponding to the return motion of the table. Fig. 18 shows the mechanism in a position assumed during the reversal of the table from return to forward motion, and Fig. 19 shows the mechanism in a position corresponding to the forward motion of the table. Fig. 20, Sheet 11, is a side view of the shifting mechanism on pulley shaft, in its neutral position. Fig. 21 is also a side view of the same mechanism at right angles to that shown in Fig. 20. Fig. 22 is an end view of Fig. 20. Fig. 23 is a sectional elevation on the line A B Fig. 20. Fig. 24 is a sectional elevation on a plane through the axis parallel to the view shown in Fig. 20. Fig. 25 is a sectional elevation on the line C D, Fig. 20. Fig. 26 is a sectional elevation on a plane through the axis parallel to the view shown in Fig. 21. Fig. 27 is a side elevation of a portion of the sliding sleeve and operating levers showing the position assumed for the return motion of the table. Fig. 28 is also a side elevation of the same parts in the position assumed during the reversal of the table from return to forward motion. Fig. 29 is also a side elevation of the same parts in the position corresponding to the forward motion of the table.

In all figures the same parts are indicated by the same numerals.

1 is the planer bed, 2 the table, 3 the right hand upright, 4 the left hand upright, 5 the crosshead, 6 the main stand of pulley frame, 7 the right hand feed stand, 8 the left hand feed stand, 9 the right hand saddle and 10 an extra saddle called the left hand saddle. The bed, table and driving gear are substantially the same as shown and described in the aforesaid patent, No. 374,908.

11 is a belt pulley or pulley friction ring keyed to the sleeve 12 on pulley shaft, which is expanded at one end to form a cone clutch surface and carries between the pulley and the expanded end a pinion gearing into the wheel 13. This wheel 13, drives the shaft 14, upon the other end of which is the pinion 15 driving the reversing feed wheel 16, which in turn drives the geared friction ring 17 in the opposite direction from 11 on the same driving shaft 18.

19 is the double faced reversing cone, feathered on an enlarged portion of the pulley shaft 18, and connected by the cross pin 20 with the operating rod 21 as previously shown and described in the aforesaid patent, No. 374,908.

22 is an abutment cone firmly attached to the pulley shaft 18, and 23 is a similar abutment cone screwed to the pulley shaft and locked in place by the nut 24 and collar 25. It will thus be seen that the pressure exerted by the reversing cone 19 is transmitted to the abutment cone 22 or 23, and that the driving effect is augmented by the additional friction of the abutment cones. The combination of 19 and 22 with 11 and 12 forms one abutment clutch and the combination of 19 and 23 with 17 forms another abutment clutch. It will also be observed that by means of the reduction gears from 12 to 17, the driving power of the latter is much greater than could well be realized by any pulley of reasonable size, and that both the forward and return motions of the table are accomplished by one and the same driving belt. Formerly, when collars on the shaft 18 occupied the places of the abutment cones, the heating and consequent expansion of the friction rings, required an increase in the travel of the reversing cone to obtain the same driving effect, and as this could not be obtained without stopping the machine and readjusting the clutch shifting mechanism, the grip of the clutch and the driving power of the machine became less as the friction rings expanded. In this case the friction rings were metallic and expanded by the heat of friction while the surfaces of the reversing cone were non-metallic which would not transmit their heat to the metal which supported them. Therefore the friction rings expanded while the reversing cone could not expand and the grip of the clutches became less and less as the temperature increased. It may easily be imagined that a reversal of these conditions, that is, a metallic reversing cone and friction rings with non-metallic surfaces, would have caused the clutches to tighten their grip as they became heated by friction, but this would be equally objectionable and it will now be observed that the introduction of abutment cones, not only increases the capacity of the driving clutches but also renders it possible at the same time to neutralize the effects of heat upon the driving power of the clutches. With this end in view, I make the exterior surfaces of the reversing cone 19, non-metallic and the exterior surfaces of the abutment cones 22 and 23 metallic, and these conditions may be reversed with the same effect. The friction surfaces shown in Fig. 7 are preferably wood and iron, but other materials may be used, the point to be aimed at being as high a co-efficient as possible without danger of cutting and with the least amount of wear. That wear will take place in any case, is of course, unavoidable, but with wood and iron, experience has shown it to be very slow. It is important however, to maintain the clutches in their original and proper state of adjustment, which contemplates as little lost motion as possible. This is important because lost motion between the clutches delays their time of action in the reversal of the machine and impairs the efficiency of the spring at the end of the pulley shaft intended to limit the pressure on the reversing cone and check the inertia of the moving parts before the grip of the clutch is tightened sufficiently to drive the table under cut. To accomplish this purpose, the abutment cone 23 can be screwed forward on the pulley shaft 18 and locked in position by the keyed collar 25 and its following nut 24. The thread on the pulley shaft is of such inclination to the axis of the shaft on the abutment cone, that it will tend to screw it against the collar 25 and hold it firmly in place. This adjustment for wear in the clutches disturbs the adjustment of the operating rod 21, which is corrected by screwing the rod as far as necessary into the pin 20, and clamping it in position by the nut 98. This nut draws the bushing 97 which is feathered on the rod 21, against the washer 95 which is feathered to the sliding block 90, and this in turn is drawn against the shoulder on the rod 21. To adjust the rod 21, the nut 98 is loosened and the rod is then turned by a wrench on the bushing 97. By tightening the nut again the feathered washer 95 is pinched between the bushing 97 and the shoulder on the rod 21, and the rod is held from turning in relation to the driving shaft by the friction of the surfaces against the washer 95. The sliding block 90 carries the balancing springs 91 and 92 and is operated by the bell crank levers 77, 77 and 78, 78 from the fulcrum block 75. These springs although differently arranged, serve the purposes indicated in the aforesaid patent, so that a further account of their functions seems at present unnecessary.

It will be understood without special illustration, that the counter-shafting required for a planer of this kind with a single driving belt is much simpler than that required for the former machine with two belt pulleys on the machine, that the cutting power is much greater and the space occupied much less.

26 is the spiral pinion keyed to the pulley shaft 18 and driving the spur wheel 27, as shown and described in the above mentioned former patent.

28 is a pinion connected with the reversing wheel 16 and driving the wheel 29 on the feed shaft 32.

30 is a stand bolted to the main frame 6 and carrying journals for the shafts 14, 18 and 31.

By means of the wheel 16 and pinions 28 and 29 the feed shaft 32 is brought down to the proper speed which is necessarily much slower than that of the belt pulley 11 to give good results. The feed shaft 32 drives the escapement wheel 33 which in turn drives the feed wheels 34 and 35, as shown and described in the patent before referred to. These wheels make half a revolution at each end of the table stroke when the machine is in operation and an independent feed for vertical slide and extra saddle is obtained by driving across the bed through the wheels 36 and 37 and the shaft 38.

39 is the engaging member of the escapement which is held in check by the lug 41 against the sliding stop 42.

40 is a clutch keyed to the shaft 32 and provided at its outer end with teeth engaging with the bevel wheels 43 and 44. These wheels turn in opposite directions upon the conical friction surfaces of an operating cone 45 and abutment cones 46 and 47, all keyed to the reversing rock shaft 48, which carries the shifting fork 49. The shaft 48 is hollow to admit the rod 50 which has a quick pitched thread cut at one end working in the nut 51, and grooves or collars opposite the clutch 45, with which it is connected by the keys 52, 52. It will now be seen that rotation of the rod 50 by means of the hand lever 53 to control the movements of the table by hand, will move the clutch 45 in either direction and cause either 43 or 44 to drive the shaft 48 by friction. This shaft carries the crank 67 which by the rod 73 connects with the lever 74, which in turn transmits its movement to the fulcrum block 75 and through the rod 21 to the driving friction clutches.

54 is a friction clutch keyed to the shaft 48, and 55 is a clutch loose on 48 engaging with 54 by the pressure of the spring 56. The clutch 55 connects with the sliding stop 42 to release the escapement, and also by the slotted link 57 with the arm 58 keyed to the shaft 59. When the arm 58 is in the position shown, Fig. 14, the slot in the link 57 allows the stop 42 to move to and fro by the action of the clutch 54 and release the escapement without moving the arm 58. The stop 42 has a limited movement equal to the lost motion in the slot of 57, and when the shaft 59 is rotated by the lever 60, the pin in arm 58 can be made to press against either end of the slot in 57 and hold the stop 42 in a fixed position so that the clutch 54 will slip in 55 and have no effect.

To hold the lever 60 in a central position, and in its two extreme positions, beveled notches are cut in the stand 61 to receive a corresponding pin 62 on the lever 60 which is made to bear against the notch in any position by the spring 63 on the shaft 59. By pushing or pulling on the lever 60 the pin 62 can be made to slip out of its notch, but when latched in any of its positions the resistance of the notch is sufficient to overcome the friction of the clutch 54.

The shafts 50 and 59 are both extended across the bed and fitted with the hand levers 64 and 65 respectively, so that the machine may be operated with equal facility from either side.

The rock shaft 48 is held in a central position when the table is at rest by the centering tumbler 66 and the arm 67 shown particularly in Figs. 16, 17, 18 and 19. The tumbler 66 is provided with two pins which rest against corresponding notches in the arm 67 and are pressed toward the latter by the spring 69 through the bell crank lever 68. It is evident that when in the position shown in Fig. 16, the spring 69 will be compressed by movement of the arm 67 in either direction and that the shaft 48 is held thereby in stable equilibrium. It is also evident that as the arm 67 approaches its central position in either direction, it will be assisted by the spring 69, and therefore, that the device shown is a safeguard against carelessness in leaving the rock shaft stand away from the central position which it must assume to prevent the clutches on pulley shaft from rubbing when not in service. In the other three positions of the tumbler 66, it acts to hold the arm 67 away from its central position and thereby assists in each case to keep the operating clutch engaged as desired. The tumbler acts therefore to hold the operating clutches both in and out of action. A similar device indicated at the point 70, Fig. 3, not shown in detail, is attached to the rod 50 to bring the levers 53 and 64 back to a central position and free the clutches on the reversing rock shaft when not in service.

71 and 72 are the forward and return motion forks pivoted to the bed and actuated by the ordinary stops on the table. These forks engage with the fork 49 fastened to the rock shaft 48 which connects through the arm 67 and rods 73 with the levers 74, 74, which move the sliding fulcrum block 75 on pulley shaft. At the same time, when the hand levers are set as shown in Fig. 16, the rotation of the rock shaft 48 moves the stop 42 and releases the escapement, which in making half a turn, moves the cam 76 as shown and described in the before mentioned former patent, and drives home the fulcrum block 75 on pulley shaft, setting the clutches for the next stroke of the planer, and operating the feed.

While the machine is running automatically the hand levers 53 and 60 and 64 and 65 are at rest in a vertical position as in Fig. 16. To stop the machine the first operation is to push the lever 60 or 65 as far as either will go in the direction the table is moving. Then when the table reaches the end of its stroke, it will stop by the action of the table stop. If desired to stop sooner the hand lever 53 or 64 must be employed to disengage the driving clutches. Having stopped the table by disengaging the driving clutches the lever 53 or 64 may be used to move the table to any position desired, without moving the escapement, and at any time, the automatic action can be restored by moving the lever 60 or 65 past its middle position to trip the escapement, and then bringing it back to its middle position and locking it there. The position of this lever when moved either side of its central position to disengage the feed, shows the direction of the last stroke taken under feed. In such machines heretofore constructed, the hand levers move with great rapidity and force, and are a constant menace to the safety of the workman. On large machines the force required to move the rock shaft directly is sometimes more than a man of average strength can exert, but with the bevel wheel clutches herein shown and described, the force on the hand lever need be no more than that required directly on the smallest machines.

The shifting mechanism on pulley shaft shown on Sheet 11, embodies new and important improvements in the direction of greater freedom, ease of working, equalization of pressure on clutch rod levers and in positions of stable equilibrium. 75 before mentioned, is the sliding fulcrum block with cam slots for the pins connecting the clutch rod levers 77, 77 and 78, 78. The pins 79 and 80 in these levers act against the rolls 81, 82, 83 and 84 as the sleeve 75 is shifted on the pulley shaft. The yoke 85 fastened to the end of the pulley shaft 18, carries the fulcrum blocks 86, 87 with the pins 88, 89 for the levers 77, 77 and 78, 78 to turn upon. The clutch rod 21 carries a sliding block 90 inclosing the springs 91 and 92 and connected to the levers 77, 77 and 78, 78 by the pins 93 and 94. The springs 91 and 92 act on opposite sides of a collar 95 on the rod 21 which collar is loose on the rod and keyed to the sliding block 90. The ring 96 is screwed in 90 when the springs are inserted and the bushing 97, which is feathered to the rod 21, is followed up by the nut 98 by which 97 and 95 are jammed against the shoulder on 21. It will be seen from this that the same system of balancing springs obtains as shown in the aforesaid former patent but in a modified form, which simplifies and perfects the adjustments required. Adjustment for wear being now effected by the abutment cone 23 with its following nut 24 and collar 25, the action of the balancing springs is no longer disturbed thereby and they have therefore been inclosed beyond the reach of the operator, leaving but one adjustment to be made at the end of the pulley shaft to regulate the grip of the forward motion clutch. By this arrangement, the balancing springs, when once properly adjusted will remain so, and the operator is required only to take up the lost motion as it occurs in the driving clutches and adjust the grip of the driving clutch for the work required.

It is evident that as the fulcrum block 75 is moved in either direction from the position shown in Fig. 24, the levers 77 and 78 will cause the rod 21 to move in the same direction with increased force and diminished movement. When 75 is moved to the position shown in Fig. 27, the pin 79 passes under the roll 81 beyond the line of centers and holds itself in place until pulled out by some external force, compressing the spring 92 and causing the clutches for return motion to be engaged. These rollers aid greatly in reducing friction and increasing freedom of movement, but movement in the opposite direction which requires much greater pressure to fully engage the clutches is accomplished by a still further reduction in friction under the maximum pressure. When moved to the position shown in Fig. 28, the forward motion clutches are engaged by the pressure of the spring 91 to check the motion of the table and start it forward before the full pressure is applied for cutting. This position is also one of stable equilibrium, for the pin 79 is beyond the center of the roll 82 and resting against the links 99, 99 which abut against their mates 100, 100 and equalize the pressure on the links 77, 77 and 78, 78. These links are firmly attached to their pins 79 and 80 and are held at the other ends by the links 101, 101 and 102, 102 attached to 75 by the pins 103 and 104. Finally, the sleeve 75 moves to the position shown in Fig. 29, straightening the toggle link 99, 99 and 100, 100 a little beyond the line of centers, making the third position of stable equilibrium. In addition to the security in position thus effected, the mechanism shown in Figs. 16, 17, 18 and 19 supplements the tendency of the fulcrum block to maintain the several positions required of it.

The device for transmitting and arresting motion shown in Fig. 11 and referred to in this application as the escapement, is designed not only to prevent shock in starting and stopping but also to effect the starting and stopping of the driven member at the same angular position.

105, Fig. 11 is a heavy spring compressed between the driven member 33 and the engaging member 39, which are screwed together as shown by quick pitch threads having a certain amount of lost motion in the direction of their common axis. The pitch of the screw is so steep that when the lug 42 is withdrawn from the stop 41, the engaging member 39 will be rotated by the pressure of the confined spring 105. The friction surfaces on 39 and 33 will then be in driving contact under spring pressure and 33 will be started by the friction due to that limited pressure, before the lost motion in the screw is taken up when the drive becomes positive. When the engaging member is arrested by contact with the stop 42, the driven member 33 continues in motion until the lost motion in the screw is taken up and the inertia of the feed train then expends itself in compressing the spring 105. This separates the driving surfaces and a retaining catch, 106, applied to the feed disk 107, or any convenient part of the feed train prevents the reaction of the spring from again producing contact until the stop 42 is withdrawn from the lug on 39. This catch is represented as engaging by friction in a groove turned in 107, but a common pawl or retaining brake might be employed, the particular form of catch being immaterial to the present invention, and as the escapement with its retaining catch forms the subject matter of another patent, it is unnecessary to enlarge further herein upon its operation.

Having now described my invention, what I claim as new, and desire to secure by Letters Patent, is—

1. In a planing machine for metal, a shaft by which motion is transmitted to the table in one direction, through a pulley friction ring, and in the opposite direction through a geared friction ring driven from the pulley friction ring, in combination with a reversing cone by which either friction ring, can be engaged with the shaft.

2. In a planing machine for metal, a shaft through which motion is transmitted to the table, two abutment friction clutches mounted thereon the driving halves of which are geared together and rotate continuously in opposite directions, and mechanism by which either driving half can be engaged with the shaft.

3. In a planing machine for metal, a shaft through which motion is transmitted to the table, two abutment friction clutches mounted thereon the driving halves of which are geared together and rotate continuously in opposite directions, in combination with metallic and non-metallic friction surfaces on the clutches arranged substantially as described, so that the expansion of the metallic surfaces will compensate each other, and that the constant travel of the reversing cone may produce uniform pressures upon the friction clutches.

4. In a planing machine for metal, a shaft through which motion is transmitted to the table, two friction clutches mounted thereon the driving halves of which are geared together and rotate continuously in opposite directions, with an abutment of one clutch adjustable on the shaft, in combination with an adjustable clutch operating rod in the shaft.

5. In a planing machine for metal, a reversing rock shaft 48 movable by the table stops through suitable levers, in combination with reversing friction clutches 43 and 44 mounted on the rock shaft, and rod 50 with its quick pitched screw, collars and handle 53 for engaging either friction clutch with the rock shaft.

6. In a planing machine for metal, an escapement stop, 42, moved automatically by the reversing rock shaft, 48, in combination with a hand lever 60 and slotted connection, 57, substantially as described, for moving the stop by hand and for locking it to prevent its movement by the reversing rock shaft.

7. In a planing machine for metal, a reversing rock shaft, in combination with a lever arm centering tumbler and spring which induce the rock shaft to assume and to maintain, the several angular positions required, for the performance of its work.

8. In a planing machine for metal, a shaft through which motion is transmitted to the table, two friction clutches mounted thereon the driving halves of which are geared together and rotate continuously in opposite directions, in combination with a sliding fulcrum block, toggle joints and rollers for operating the friction clutches, reducing friction, and for inducing the fulcrum block to assume and to maintain the several positions required of it.

9. In a planing machine for metal, a shaft by which motion is transmitted to the table in one direction, through a pulley friction ring, and in the opposite direction, through a geared friction ring driven from the pulley friction ring, in combination with a feed shaft, driven from the reversing wheel of the train, which gears these friction rings together.

WILFRED LEWIS.

Witnesses:
FRANK H. MASSEY,
E. R. HARPER.